(12) United States Patent
Handa et al.

(10) Patent No.: US 8,808,098 B2
(45) Date of Patent: Aug. 19, 2014

(54) BALL TYPE CONSTANT VELOCITY JOINT

(75) Inventors: Yuri Handa, Osaka (JP); Satoshi Suzuki, Handa (JP)

(73) Assignee: JTEKT Corporation, Osaka-shi (JP)

(*) Notice: Subject to any disclaimer, the term of this patent is extended or adjusted under 35 U.S.C. 154(b) by 0 days.

(21) Appl. No.: 13/807,834

(22) PCT Filed: Jul. 4, 2011

(86) PCT No.: PCT/JP2011/065262
§ 371 (c)(1),
(2), (4) Date: Mar. 15, 2013

(87) PCT Pub. No.: WO2012/005206
PCT Pub. Date: Jan. 12, 2012

(65) Prior Publication Data
US 2013/0172091 A1   Jul. 4, 2013

(30) Foreign Application Priority Data
Jul. 7, 2010   (JP) .................................. 2010-154645

(51) Int. Cl.
*F16D 3/224* (2011.01)
(52) U.S. Cl.
USPC .......................................... 464/145; 464/906
(58) Field of Classification Search
CPC ................. F16D 3/2237; F16D 3/224; F16D 2003/22309; Y10S 464/906
USPC ......................................... 464/145, 906, 146
See application file for complete search history.

(56) References Cited

U.S. PATENT DOCUMENTS

| | | | | |
|---|---|---|---|---|
| 5,509,857 A | * | 4/1996 | Flaugher | 464/145 |
| 6,796,906 B2 | * | 9/2004 | Cermak | 464/145 |
| 7,211,002 B2 | * | 5/2007 | Dine et al | 464/145 |

FOREIGN PATENT DOCUMENTS

| | | |
|---|---|---|
| JP | 2000 145805 | 5/2000 |
| JP | 2000 154833 | 6/2000 |
| JP | 2005 226732 | 8/2005 |
| JP | 2008 008323 | 1/2008 |
| JP | 2008 309221 | 12/2008 |
| JP | 2009 250365 | 10/2009 |

OTHER PUBLICATIONS

International Search Report Issued Aug. 23, 2011 in PCT/JP11/65262 Filed Jul. 4, 2011.

* cited by examiner

*Primary Examiner* — Gregory Binda
(74) *Attorney, Agent, or Firm* — Oblon, Spivak, McClelland, Maier & Neustadt, L.L.P.

(57) ABSTRACT

A constant velocity joint including an outer race including a plurality of outer race ball grooves on an internal surface thereof; an inner race arranged inside the outer race and including a plurality of inner race ball grooves on a peripheral surface thereof; a plurality of balls respectively received in the outer and inner race ball grooves for transmitting a torque between the outer race and the inner race; and a cage arranged between the outer and inner races and including a plurality of window portions that respectively receive balls in a circumferential direction thereof. On at least one of a plurality of groove wall protrusions that are configured by sidewall surfaces of the inner race ball grooves adjoining cutouts are respectively formed on axially opposite sides of an inner race on a peripheral side of the inner race.

3 Claims, 3 Drawing Sheets

BALL TYPE CONSTANT VELOCITY JOINT

FIELD OF THE INVENTION

The present invention relates to a ball type constant velocity joint.

BACKGROUND ART

Heretofore, in the assembling of a ball type constant velocity joint, as described in FIG. 5 of JP2000-154833 A (Patent Document 1), it is done to assemble an inner race inside a cage. Specifically, in the state that the axial direction of the inner race and the axial direction of the cage are set to be almost orthogonal, one of groove wall protrusions (inner race peripheral protrusions) which are configured by sidewall surfaces of adjoining inner race ball grooves is inserted into a widow portion of the cage. In this state, the whole of the inner race is made to come inside the cage by pivoting the inner race relative to the cage about the axis of the inner race. Thereafter, the axial direction of the inner race and the axial direction of the cage are aligned, whereby the assembling of the inner race and the cage is completed.

In order to insert the groove wall protrusion (inner race peripheral protrusion) of the inner race into the window portion of the cage in this assembling, the inner race is formed at one axial end on the peripheral side with cutouts directed radially inward (refer to FIG. 1 of Patent Document 1). This makes the groove wall protrusions of the inner race narrow in axial length, so that the insertion into the window portion becomes possible.

SUMMARY OF THE INVENTION

Problem to be Solved by the Invention

By the way, the cage takes the form that annular portions on axially opposite sides of the cage are coupled by a plurality of pole portions. That is, each window portion of the cage is a section that is encircled by adjoining pole portions and the annular portions on the axially opposite sides. Then, it is not easy to secure high strength and rigidity around the pole portions. Particularly, where the inner race and the cage are tried to be miniaturized for downsizing of the constant velocity joint, it becomes unable to assemble the inner race inside the cage. Although thinning the pole portions of the cage makes such an assembling possible, such thinning would result in lowering the strength and rigidity of the cage.

The present invention has been made taking the foregoing circumstances into consideration, and an object thereof is to provide a ball type constant velocity joint that is capable of securing the strength and rigidity of a cage and at the same time, of downsizing the ball type constant velocity joint.

Measures for Solving the Problem (1) A ball type constant velocity joint according to the present invention resides in a ball type constant velocity joint comprising an outer race formed to a cylindrical shape with an opening portion on at least one axial side and formed with a plurality of outer race ball grooves on an internal surface thereof; an inner race arranged inside the outer race and formed with a plurality of inner race ball grooves on a peripheral surface thereof; a plurality of balls that roll on the respective outer race ball grooves and the respective inner race ball grooves and that transmit a torque between the outer race and the inner race; and a cage formed annularly, arranged between the outer race and the inner race, and formed with a plurality of window portions that respectively receive balls in a circumferential direction thereof; wherein on at least one of a plurality of groove wall protrusions that are configured by sidewall surfaces of the inner race ball grooves adjoining, cutouts are respectively formed on axially opposite sides of the inner race on a peripheral side of the inner race.

In assembling the inner race inside the cage, it is necessary to insert a groove wall protrusion of the inner race (a protrusion on the peripheral side of the inner race) into a window portion of the cage further deeply. In the present invention, the cutouts are formed on the axially opposite sides of the groove wall protrusion (the inner race peripheral protrusion) of the inner race. Accordingly, in comparison with the prior art, it is possible to insert the groove wall protrusion into the window portion of the cage further deeply where the ball type constant velocity joint is the same degree in dimension as that in the prior art. In other words, according to the present invention, even where the ball type constant velocity joint is downsized, it is possible to assemble the inner race inside the cage. Here, because it is not required to make the pole portions of the cage thinner, the strength and rigidity of the cage can be secured to the same degree as those in the prior art. Like this, according to the present invention, it is possible to secure the strength and rigidity of the cage and at the same time, to realize the downsizing of the ball type constant velocity joint.

(2) Further, on the one axial side of the inner race, a center locus of the ball when the ball rolls on the inner race ball groove may be set to a circular arc; and the cutout on the one axial side may be formed so that a contact point locus between the inner race ball groove and the ball is set at an axial position where the cutout on the one axial side is formed.

Thus, where the center locus of the ball on the one axial side of the inner race is circular arc, the distance from the peripheral surface of the groove wall protrusion before the forming of the cutout to the groove bottom is sufficiently long. Even where the radial depth of the cutout is made to be sufficiently deep, it is possible to set the contact point locus between the inner race ball groove and the ball. Then, in the present invention, because the cutout is also formed on the other axial side of the groove wall protrusion, the assembling of the inner race and the cage becomes possible without setting the radial depth of the cutout of the groove wall protrusion on the one axial side to the extent that the contact point locus between the inner race ball groove and the ball cannot be secured.

(3) Further, the axial position where the cutout on the other axial side is formed may be set on the other axial side beyond the contact point locus between the inner race ball groove and the ball at the time of a torque transmission.

Where the design is changed to make the outer diameter of the inner race smaller in comparison with that in the prior art with the joint operating angle kept at a predetermined angle, the operating range of the ball at the time of a torque transmission, that is, in the state that the ball type constant velocity joint is in use becomes shorter. This is apparent from the relation that the length of a circular arc centered at a certain point becomes longer with an increase in radius and becomes shorter with a decrease in radius. On the other hand, the internal surface of the inner race is formed with, for example, a spline for enabling the torque transmission to be done with the peripheral surface of a shaft. For transmission of a required torque, the axial length of the spline is determined in design. That is, the axial length of the inner race is determined in dependence on the axial length of the spline. Accordingly, although the operating range of the ball becomes narrow as a result of downsizing the outer diameter of the inner race, the axial length required for the inner race remains unchanged, so that on the inner race ball groove, there exists a portion wherein the contact point locus between the inner race ball groove and the ball is not needed to be secured. Therefore, in the present invention, such a portion is utilized in forming the cutout on the other axial side.

That is, the present invention is designed so that the contact point locus between the inner race ball groove and the ball is not set at the axial position where the cutout on the other axial side is formed. Thus, it becomes possible to make the radial depth of the cutout on the other axial side deep sufficiently. Accordingly, even where the inner race and the cage are downsized, the assembling of the inner race with the cage becomes possible.

(4) Further, on the other axial side of the inner race, the center locus of the ball when the ball rolls on the inner race ball groove may be set to a shape that is along the axial direction of the inner race.

Thus, the ball center locus on the other axial side is made to a shape that is along the axial direction of the inner race. In this case, it results that the inner race ball groove on the other axial side becomes shallow in groove depth. For the reason, it is not easy for the cutout to secure a sufficient radial depth. However, according to the present invention, since the cutout on the other axial side can be formed without securing the contact point locus between the inner race ball groove and the ball, it becomes possible to form the cutout being deep in radial depth. Like this, since the radial depth of the cutout on the other axial side can be made to be as deep as possible, the assembling of the inner race with the cage becomes possible even where the inner race and the cage are downsized.

BRIEF DESCRIPTION OF THE DRAWINGS

[FIGS. 3(a) and 3(b)] are views showing the states that the inner race of the ball type constant velocity joint is assembled inside a cage, wherein FIG. 3(a) is the view of the cage taken along the axial direction and wherein FIG. 3(b) is the view as viewed from the right side of FIG. 3(a). In FIG. 3(b), a part of the cage is shown as section for showing the state that the inner race has been inserted into a window portion of the cage.

FORMS FOR PRACTICING THE INVENTION

Figure 1:
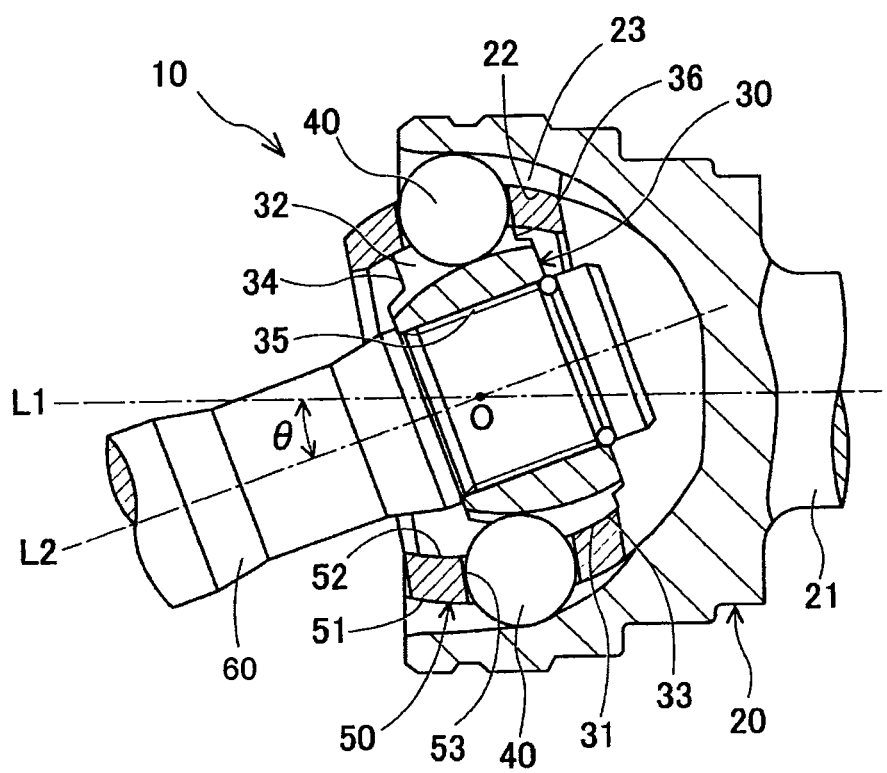
[FIG. 1] is a sectional view of a ball type constant velocity joint taken along the axial direction.

With reference to FIG. 1, description will be made regarding the construction of a ball type constant velocity joint (hereafter, referred to simply as "constant velocity joint") in the present embodiment. FIG. 1 is a sectional view taken along the axial direction of the constant velocity joint 10 according to the present embodiment in the state of being held at a joint operating angle Θ being a predetermined angle. In the following description, the "opening side" of an outer race 20 means the left side in FIG. 1, and the "depth side" of the outer race 20 means the right side in FIG. 1.

As shown in FIG. 1, the constant velocity joint 10 in the present embodiment is a ball type constant velocity joint of the joint center fixed type (also called as "Rzeppa constant velocity joint") and can be used preferably as an outboard joint for front drive shafts for a vehicle. Of course, it is applicable to rear drive shafts. Particularly, in the present embodiment, description will be made taking as an example a ball type constant velocity joint which is of the undercut-free type and the joint center fixed type.

The constant velocity joint 10 is composed of an outer race 20 having a plurality of outer race ball grooves 23, an inner race 30 having a plurality of inner race ball grooves 32, a plurality of balls 40, a cage 50 and a shaft 60. Hereafter, the respective components will be described in detail.

The outer race 20 is formed to a cup shape (bottomed cylindrical shape) with an opening portion on the left side in FIG. 1 (corresponding to "one axial side" in the present invention). A coupling shaft 21 is formed integrally on an outer side (right side in FIG. 1) of a cup bottom portion of the outer race 20 to extend in the outer race axial direction. The coupling shaft 21 is coupled to another power transmission shaft. The internal surface of the outer race 20 is formed to a concave spherical shape. Specifically, the concave spherical internal surface 22 is formed as a part of a spherical surface drawn with the curvature center on an intersection point O between an outer race axis L1 and an inner race axis L2 and is formed to a concave circular arc shape as viewed in a section taken along the outer race axial direction.

Further, on the internal surface of the outer race 20, a plurality of outer race ball grooves 23 each taking the form of an almost concave circular arc in a section orthogonal to the outer race axis are formed to extend in an almost outer race axial direction. The plurality (six in the present embodiment) of these outer race grooves 23 are formed at equiangular intervals (60-degree intervals in the present embodiment) in the circumferential direction as viewed in a section taken in the radial direction. Herein, the outer race axial direction means a direction in which the center axis of the outer race 20 passes, that is, the rotational axis direction of the outer race 20.

The inner race 30 is formed annularly and is arranged inside the outer race 20. The peripheral surface 31 of the inner race 30 is formed to a convex spherical shape. Specifically, the convex spherical peripheral surface 31 of the inner race 30 is formed as a part of a spherical surface that is drawn with its curvature center at the intersection point O between the outer race axis L1 and the inner race axis L2 and is formed to a convex circular arc as viewed in a section taken in the inner race axial direction.

Further, on the peripheral surface of the inner race 30, a plurality of inner race ball grooves 32 each taking the form of an almost circular arc concave in a section orthogonal to the inner race axis are formed to extend in an almost inner race axial direction. The plurality (six in the present embodiment) of these inner race ball grooves 32 are formed at equiangular intervals (60-degree intervals in the present embodiment) in the circumferential direction to be the same in number as the outer race ball grooves 23 formed on the outer race 20. That is, the respective inner ball grooves 32 are located to face the respective outer race ball grooves 23 of the outer race 20.

Between the inner race ball grooves 32 adjoining, there are respectively formed groove wall protrusions 33 that are configured by respective wall surfaces of these inner race ball grooves 32 and that protrude radially outward. A first notch or cutout 34 toward radially inward is provided at the convex spherical peripheral surface 31 side on one axial side (left side in FIG. 1) of each groove wall protrusion 33. Further, a second notch or cutout 36 toward radially inward is provided at the convex spherical peripheral surface 31 side on the other axial side (right side in FIG. 1) of each groove wall protrusion 33. The axial length at the end portion in the radial direction of the groove wall protrusions 33 is shortened by the first cutouts 34 and the second cutouts 36. The details of the first cutouts 34 and the second cutouts 36 will be described with reference to FIG. 2. Although the first cutout 34 and the second cutout 36 are formed on all of the groove wall protrusions 33, they may be formed on only one of the groove wall protrusions 33.

Further, on the internal surface of the inner race 30, there is formed an internal spline 35 extending in the inner race axial direction. The internal spline 35 is in fit (mesh) with an external spline of the shaft 60. Herein, the inner race axial direction means a direction in which the center axis of the inner race 30 passes, that is, the rotational axis direction of the inner race 30.

The plurality of balls 40 are arranged to be put between the outer race ball grooves 23 of the outer race 20 and the inner race ball grooves 32 of the inner race 30 facing the outer race ball grooves 23. Then, the respective balls 40 are engaged with the respective outer race ball grooves 23 and the respective inner race ball grooves 32 in the circumferential direction (about the outer race axis or about the inner race axis) to be rollable thereon. Therefore, the balls 40 transmit a torque between the outer race 20 and the inner race 30.

The cage 50 is formed annularly. The peripheral surface 51 of the cage 50 is formed to a partial spherical shape or convex spherical shape that almost corresponds to the concave spherical internal surface 22 of the outer race 20. On the other hand, the internal surface of the cage 50 is formed to a partial spherical shape or concave spherical shape that almost corresponds to the convex spherical peripheral surface 31 of the inner race 30. The cage 50 is arranged between the concave spherical internal surface 22 of the outer race 20 and the convex spherical peripheral surface 31 of the inner race 30. The cage 50 has a plurality of window portions 53 that are arranged at equiangular intervals in the circumferential direction (in the circumferential direction about the cage axis) and that are through holes being an almost rectangular. The window portions 53 of the cage 50 are formed to be the same in number as the balls 40. Then, the balls 40 are received in the respective window portions 53 one by one. Corner portions at four places of each window portion 53 are formed to a circular arc shape. Thus, the respective pole portions located between the adjoining window portions 53 can be enhanced in strength and rigidity.

Figure 2:
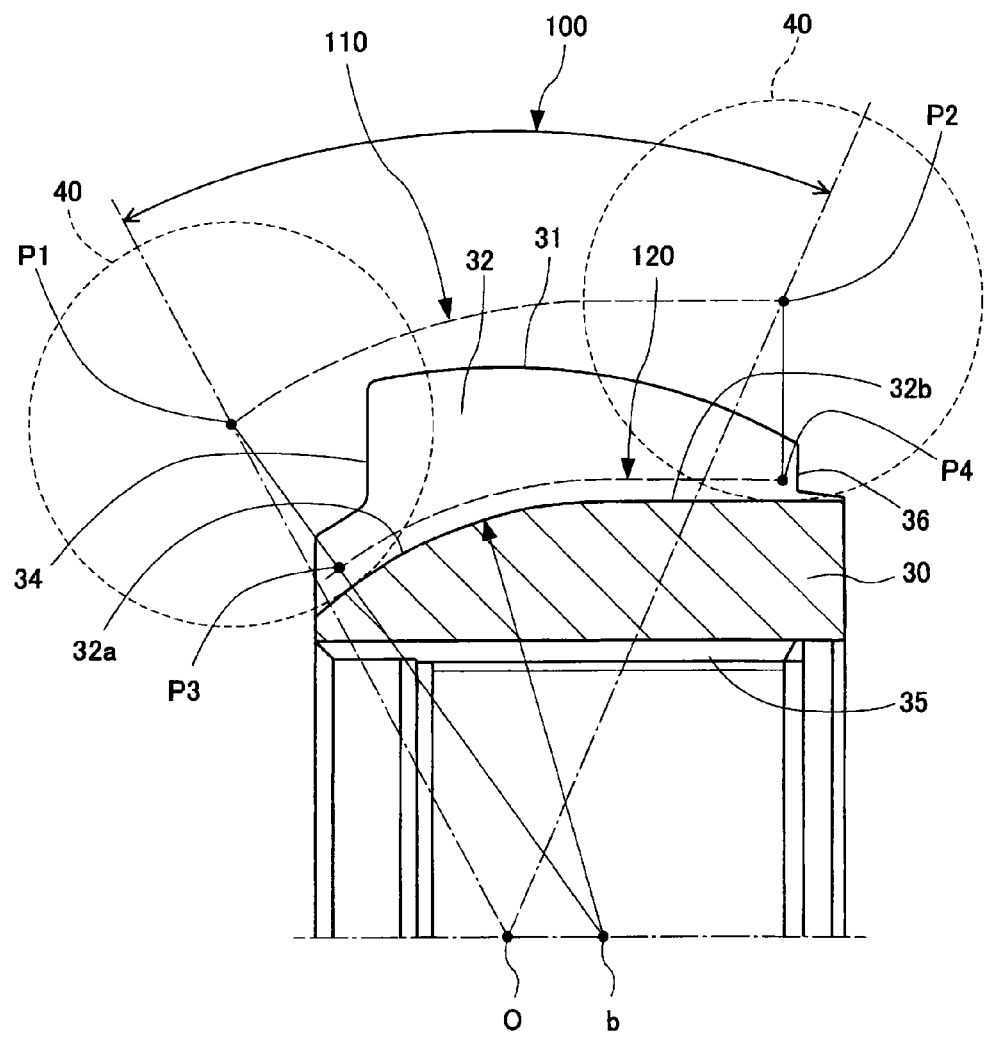
[FIG. 2] is an enlarged, fragmentary sectional view of an inner race taken along the axial direction.

Next, with reference to FIG. 2, description will be made regarding the details of the inner race 30 and in particular, the first cutout 34 and the second cutout 36. As shown in FIG. 2, the groove bottom of each inner race ball groove 32 is formed by a curved groove bottom 32a of a circular arc shape that is drawn with its curvature center at an offset point b shifted from the intersection point O toward the depth side (right side in FIGS. 1 and 2) of the outer race 20, and a straight groove bottom 32b that extends from one end of the curved groove bottom 32a in the inner race axial direction.

A joint operating angle 100 within which the constant velocity joint 10 in the present invention is able to transmit a torque, that is, an angle that the outer race 20 and the shaft 60 make with respect to each other in the state of use of the constant velocity joint 10 is set within a range of, for example, 40 to 50 degrees and is indicated by the arrows in FIG. 2. Then, within the joint operating angle 100 within which the torque transmission is possible, the center locus 110 of the ball 40 along which the ball 40 rolls on the inner race ball groove 32 on the one axial side (left side in FIG. 2) of the inner race 30 is set to a circular arc shape. Further, within the joint operating angle 100, the center locus 110 of the ball 40 along which the ball 40 rolls on the inner race ball groove 32 on the other axial side (right side in FIG. 2) of the inner race 30 is set to a shape that is along the inner race axial direction. That is, when the constant velocity joint moves through the joint operating angle 100 being the maximum, the center locus 110 of the ball 40 at the time of the torque transmission in the state of an actual use moves between P1 and P2.

Here, in the description with reference to FIG. 1, the section of the inner race ball groove 32 taken in the direction orthogonal to the inner race axis has been assumed to be formed to an almost concave circular arc. In detail, the inner race ball groove 32 is formed to a so-called "Gothic arch" shape which is made by, for example, connecting two concave circular arcs whose centers differ. Accordingly, as viewed in the direction orthogonal to the axis of the inner race 30, the contact point locus 120 between the inner race ball groove 32 and the ball 40 takes the position shifted radially outward from the groove bottoms 32a, 32b of the inner race ball groove 32 as indicated by the broken line in FIG. 2. Further, although not illustrated, as viewed in the axial direction of the inner race 30, the contact point locus 120 between the inner race ball groove 32 and the ball 40 is at two places shifted in the circumferential direction in the inner race ball groove 32.

Further, where the ball 40 rolls on the inner race ball groove 32 within the torque transmittable joint operating angle 100 along the inner race ball groove 32, the contact point locus 120 between the inner race ball groove 32 and the ball 40 becomes a locus (between P3 and P4) indicated by the broken line in FIG. 2. Specifically, an end point P3 of the contact point locus 120 on one axial side (left side in FIG. 2) is located on a straight line connecting the end point P1 on one axial side of the center locus 110 of the ball 40 and the offset point b. On the other hand, an end point P4 of the contact point locus 120 on the other axial side (right side in FIG. 2) is located on a perpendicular line that heads from the end point P2 on the other axial side of the center locus 110 of the ball 40 toward the rotational axis of the inner race 30. The contact point locus 120 becomes an almost circular arc shape within a range (the range covering the curved groove bottom 32a) within which the groove bottom of the inner race groove 32 takes the form of a circular arc curve, and becomes an almost straight line shape within a range (the range covering the straight groove bottom 32b) within which the groove bottom of the inner race ball groove 32 is straight.

The first cutout 34 is formed at an end portion of the range within which the groove bottom of the inner race 32 becomes the circular arc curve (the range of the curved groove bottom 32a). A radially inward bottom portion of the first cutout 34 is set to be located radially outside beyond the contact point locus of the ball 40 on the inner race groove 32. That is, the first cutout 34 is formed so that the contact point locus between the inner race ball groove 34 and the ball 40 is set at an axial position where the first cutout is formed.

On the other hand, the second cutout 36 is formed at an end portion of the range within which the groove bottom of the inner race ball groove 32 becomes a straight line shape (the range of the straight groove bottom 32b). The axial position where the second cutout 36 is formed is set on the other axial side beyond the contact point locus 120 between the inner race ball groove 32 and the ball 40 at the time of the torque transmission. That is, the second cutout 36 is formed on the other axial side (right side in FIG. 2) beyond the end point P4 of the contact point locus 120 on the other axial side.

Specifically, a radially inward bottom portion of the second cutout 36 is set to be located at radially inside beyond an extension line of the contact point locus 120 between the inner race ball groove 32 and the ball 40. The extension line of the contact point locus 120 is a line that is extended as it is with the curvature of the contact point locus 120 kept. That is, in the present embodiment, since the contact point locus 120 on the other axial side is a straight line shape, the extension line becomes a straight line made by extending the straight line shape as it is.

Further, the radially inward bottom portion of the second cutout 36 is set to be located radially outside of the straight groove bottom 32b of the inner race ball groove 32 at the axial position of the inner race 30 where the second cutout 36 is formed. That is, it results that the inner race ball groove 32 is formed a little at the axial position where the second cutout 36 is formed, on the inner race 30.

Figure 3A:
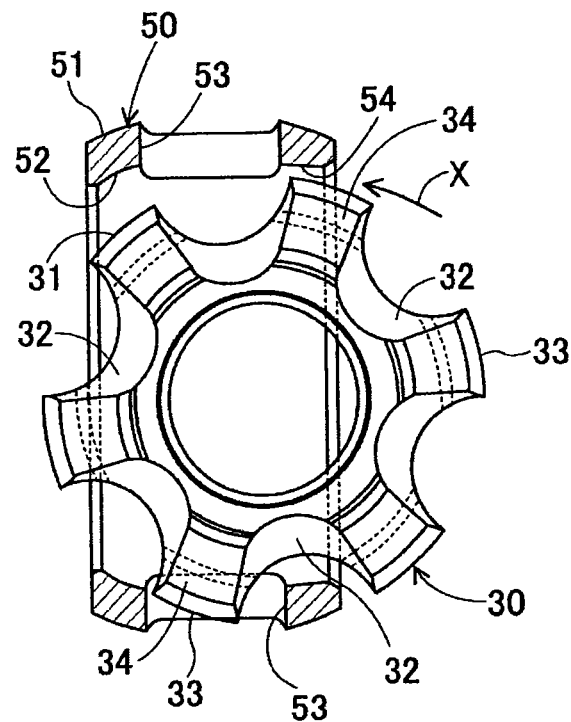
Figure 3B:
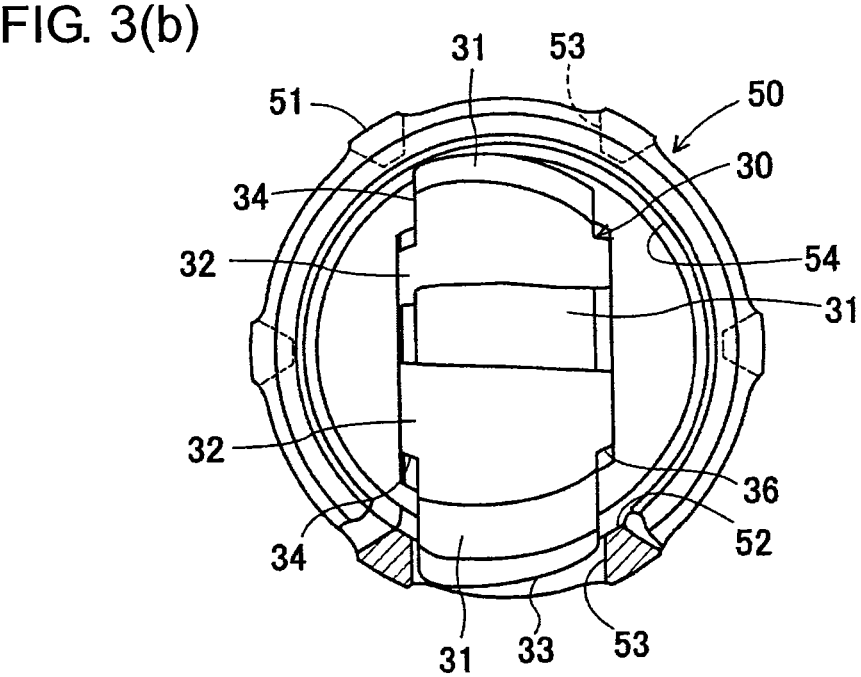

Next, with reference to FIGS. 3(a) and (b), description will be made in detail regarding the case where the inner race 30 constructed as described above is assembled in the cage 50. In assembling the inner race 30 inside the cage 50, as shown in FIGS. 3(a) and (b), first of all, a state is created wherein the axial direction of the inner race 30 and the axial direction of the cage 50 are made to be almost orthogonal. In this state, an inner race ball groove 32 of the inner race 30 is put across an introducing surface 54 which is formed on one end side (right side in FIG. 3(a)) of the internal surface of the cage 50, and one groove wall protrusion 33 between the inner race ball grooves 32 is inserted into the window portion 53. Here, the groove wall protrusions 33 of the inner race 30 have been formed with the first cutouts 34 on one axial end side thereof (left side in FIG. 3(b)), and the groove wall protrusions 33 of the inner race 30 have been formed with the second cutouts 34 on the other axial end side thereof (right side in FIG. 3(b)). Accordingly, it is possible to easily insert one groove wall protrusion 33 of the inner race 30 into the window portion 53 of the cage 50 without bringing about an interference.

Then, the inner race 30 is received inside the cage 50 by being pivoted about the neighborhood of the inserted groove wall protrusion 33 in the arrowed X-direction indicated in FIG. 3(a). Subsequently, after the center point of the convex spherical peripheral surface 31 of the inner race 30 is aligned with the center point of the internal surface 52 of the cage 50, the inner race 30 is turned through 90 degrees to make the axial direction of the inner race 30 agree with the axial direction of the cage 50. In this way, by bringing the convex spherical peripheral surface 31 of the inner race 30 into spherical engagement with the internal surface 52 of the cage 50, the assembling of the inner race 30 with the cage 50 is completed.

The inner race 30 and the cage 50 which have been assembled in this way are placed inside the outer race 20. Then, the balls 40 are inserted one by one into the outer race ball grooves 23, the inner race ball grooves 32 and the window portions 53 of the cage 50. Finally, the shaft 60 is inserted inside the inner race 30, whereby the assembling of the constant velocity joint 10 is completed.

As described above, by forming the cutouts (the first cutouts 34 and the second cutouts 36) at the axially opposite ends of the groove wall protrusions 33 of the inner race 30, it is possible to insert the groove wall protrusion 33 into the window portion 53 of the cage 50 further deeply in comparison with the prior art where the constant velocity joint 10 is the same degree in dimension as that in the prior art. In other words, even where the constant velocity joint 10 is downsized, it is possible to assemble the inner race 30 inside the cage 50. Here, since the pole portions of the cage 50 are not required to be thin for the assembling of the inner race 30, the cage 50 can be secured to the same degree in strength and rigidity as that in the prior art. Like this, it can be realized to secure the strength and rigidity of the cage 50 and at the same time, to realize the downsizing of the constant velocity joint 10.

Further, where the center locus 110 of the ball 40 is a circular arc on one axial side of the inner race 30, the distance from the peripheral surface of the groove wall protrusion 33 to the curved groove bottom 32a is sufficiently long before the first cutout 34 is formed. Even where the radial depth of the first cutout 34 is made to be sufficiently deep, it is possible to set the contact point locus 120 between the inner race ball groove 32 and the ball 40. Further, because the second cutout 36 is formed also on the other axis side of the groove wall protrusion 33, the assembling of the inner race 30 and the cage 50 becomes possible without setting the radial depth of the first cutout 34 on one axial side of the groove wall protrusion 33 to such an extent that makes it unable to secure the contact point locus 120 between the inner race ball groove 32 and the ball 40.

By the way, where the design is changed to decrease the outer diameter of the inner race 30 in comparison with the prior art with the joint operating angle set to a predetermined angle (the angle required for a front drive shaft such as, form example, 40 to 50 degrees), the operating range of the ball 40 becomes short at the time of a torque transmission or in the state that the constant velocity joint 10 is in use. This is apparent from the relation that the length of a circular arc centered at a certain point becomes longer with an increase in radius and becomes shorter with a decrease in radius. On the other hand, for enabling the torque transmission to be done with the peripheral surface of the shaft 60, the internal spline is formed on the internal surface of the inner race 30. For transmission of a required torque, the axial length of the internal spline 35 is determined in design. That is, the axial length of the inner race 30 is determined in dependence on the axial length of the internal spline 35. Thus, although the downsizing of the outer diameter of the inner race 30 results in narrowing the operating range of the ball, the required axial length of the inner race 30 does not change from that in the prior art, and hence, it results that there exists a portion where the contact point locus 120 between the inner race ball groove 32 and the ball 40 is not required to be secured in the inner race ball groove 32. Therefore, this portion is utilized to form the second cutout 36.

In other words, the axial position where the second cutout 36 is formed is designed not to set thereon the contact point locus 120 between the inner race ball groove 32 and the ball 40. This makes it possible to sufficiently deepen the radial depth of the second cutout 36. From this point of view, it becomes possible to assemble the inner race 30 and the cage 50 even where the inner race 30 and the cage 50 are downsized.

Further, the center locus 110 of the ball 40 on the other axial side (right side in FIG. 2) is made to a shape that is along the axial direction of the inner race 30, that is, to a straight line shape. In this case, as apparent from FIG. 2, the groove depth of the inner race ball groove 32 on the other axial side is made to be shallower than the groove depth of the inner race ball groove 32 on one axial side. Therefore, if it were tried to secure the contact point locus 120, it would not be easy to secure a sufficient radial depth at the second cutout 36. However, because the second cutout 36 is formed without securing thereat the contact point locus 120 between the inner race ball groove 32 and the ball 40, it is possible to form the second cutout 36 being deep in the radial depth. Like this, from the fact that the radial depth of the second cutout 36 is made to be as deep as possible, it becomes possible to assemble the inner race 30 and the cage 50 even where the inner race 30 and the cage 50 are downsized.

Although in the foregoing embodiment, description has been made regarding the joint center fixed ball type constant velocity joint which is of the undercut-free type (UF), it is possible to form the first cutouts 34 and the second cutouts 36 on a joint center fixed ball type constant velocity joint which is of the Barfiled type described in JP2008-008323 A and the like. Also in this case, it becomes possible to realize the downsizing of the constant velocity joint and at the same time, to perform the assembling of the inner race 30 and the cage 50. Further, where the application is made to a double offset type sliding constant velocity joint in addition to the joint center fixed ball type constant velocity joints, it becomes possible to realize the downsizing of the constant velocity joint and at the same time, to perform the assembling of the inner race 30 and the cage 50.

DESCRIPTION OF SYMBOLS

10: ball type constant velocity joint, 20: outer race, 23: outer race ball groove
30: inner race, 32: inner race ball groove, 34: first cutout, 36: second cutout
40: ball, 50: cage, 53: window portion, 60: shaft
100: joint operating angle, 110: ball center locus
120: contact point locus between inner race ball groove and ball

The invention claimed is:

1. A constant velocity joint comprising:

an outer race formed to a cylindrical shape with an opening portion on at least one axial side and including a plurality of outer race ball grooves on an internal surface thereof;

an inner race arranged inside the outer race and including a plurality of inner race ball grooves on a peripheral surface thereof, wherein the groove bottom of each of the inner race ball grooves is a circular arc at one axial side of each respective inner race and is a substantially straight line at the other axial side of each respective inner race;

a plurality of balls that roll on the respective outer race ball grooves and the respective inner race ball grooves and that transmit a torque between the outer race and the inner race; and a cage formed annularly, arranged between the outer race and the inner race, and including a plurality of window portions that respectively receive balls in a circumferential direction thereof;

wherein on at least one of a plurality of groove wall protrusions that are configured by sidewall surfaces of adjoining ones of the inner race ball grooves, a first cutout is formed at the one axial side of the inner race and a second cutout is formed at the other axial side of the inner race, wherein a contact point locus between each of the inner race ball grooves and the balls that roll on the inner race ball grooves is located radially outward from groove bottoms of the respective inner race ball grooves, wherein an axial position where the second cutout on the other axial side is formed is provided at a location beyond the contact point locus in the axial direction toward the other axial side, wherein a radially inward bottom portion of each of the first cutouts is located radially outside of the contact point locus, and wherein a radially inward bottom portion of each of the second cutouts is located radially inside an extension of the contact point locus.

2. The constant velocity joint in claim 1, wherein:

on the one axial side of the inner race, a center locus of the ball when the ball rolls on the inner race ball groove is set to a circular arc; and the cutout on the one axial side is formed so that the contact point locus extends to an axial position where the cutout on the one axial side is formed.

3. The constant velocity joint in claim 1, wherein:

on the other axial side of the inner race, a center locus of the ball when the ball rolls on the inner race ball groove is set to a shape that is along an axial direction of the inner race.

\* \* \* \* \*